United States Patent

Nakamichi

[11] Patent Number: 5,822,296
[45] Date of Patent: *Oct. 13, 1998

[54] DISK PLAYBACK DEVICE

[75] Inventor: Niro Nakamichi, Tokyo, Japan

[73] Assignee: Nakamichi Corporation, Japan

[*] Notice: The term of this patent shall not extend beyond the expiration date of Pat. No. 5,561,658.

[21] Appl. No.: 844,844

[22] Filed: Apr. 22, 1997

Related U.S. Application Data

[63] Continuation of Ser. No. 518,415, Aug. 23, 1995, abandoned.

[30] Foreign Application Priority Data

Aug. 26, 1994 [JP] Japan ................................. 6-225496
Jul. 10, 1995 [JP] Japan ................................. 7-196987
Jul. 10, 1995 [JP] Japan ................................. 7-196988

[51] Int. Cl.$^6$ .................................................. G11B 17/04
[52] U.S. Cl. ........................................ 369/192; 369/75.2
[58] Field of Search ............................. 369/36, 38, 75.1, 369/77.1, 178, 192; 360/92; 414/793.2–793.5, 794.4, 900, 935–936, 941

[56] References Cited

U.S. PATENT DOCUMENTS

| | | | |
|---|---|---|---|
| 5,123,001 | 6/1992 | Nakamichi et al. | 369/36 |
| 5,374,153 | 12/1994 | Nishi | 414/417 |
| 5,561,658 | 10/1996 | Nakamichi et al. | 369/263 |
| 5,682,369 | 10/1997 | Nakamichi | 369/75.2 |

FOREIGN PATENT DOCUMENTS

| | | |
|---|---|---|
| 60-106250 | 7/1985 | Japan . |
| 6124851 | 2/1986 | Japan . |
| 6247893 | 3/1987 | Japan . |
| 7-7560 | 1/1995 | Japan . |

*Primary Examiner*—Stuart S. Levy
*Assistant Examiner*—George J. Letscher
*Attorney, Agent, or Firm*—Morrison Law Firm

[57] ABSTRACT

A disk playback device has at least one endless drive belt stretched along a direction of disk transport between a store position, a playback position and an eject position. The endless drive belt is translated in a direction perpendicular to the direction of disk transport along a plane parallel to said disk, allowing the drive belt to move away from said disk rim without requiring a large space parallel to the disk.

19 Claims, 16 Drawing Sheets

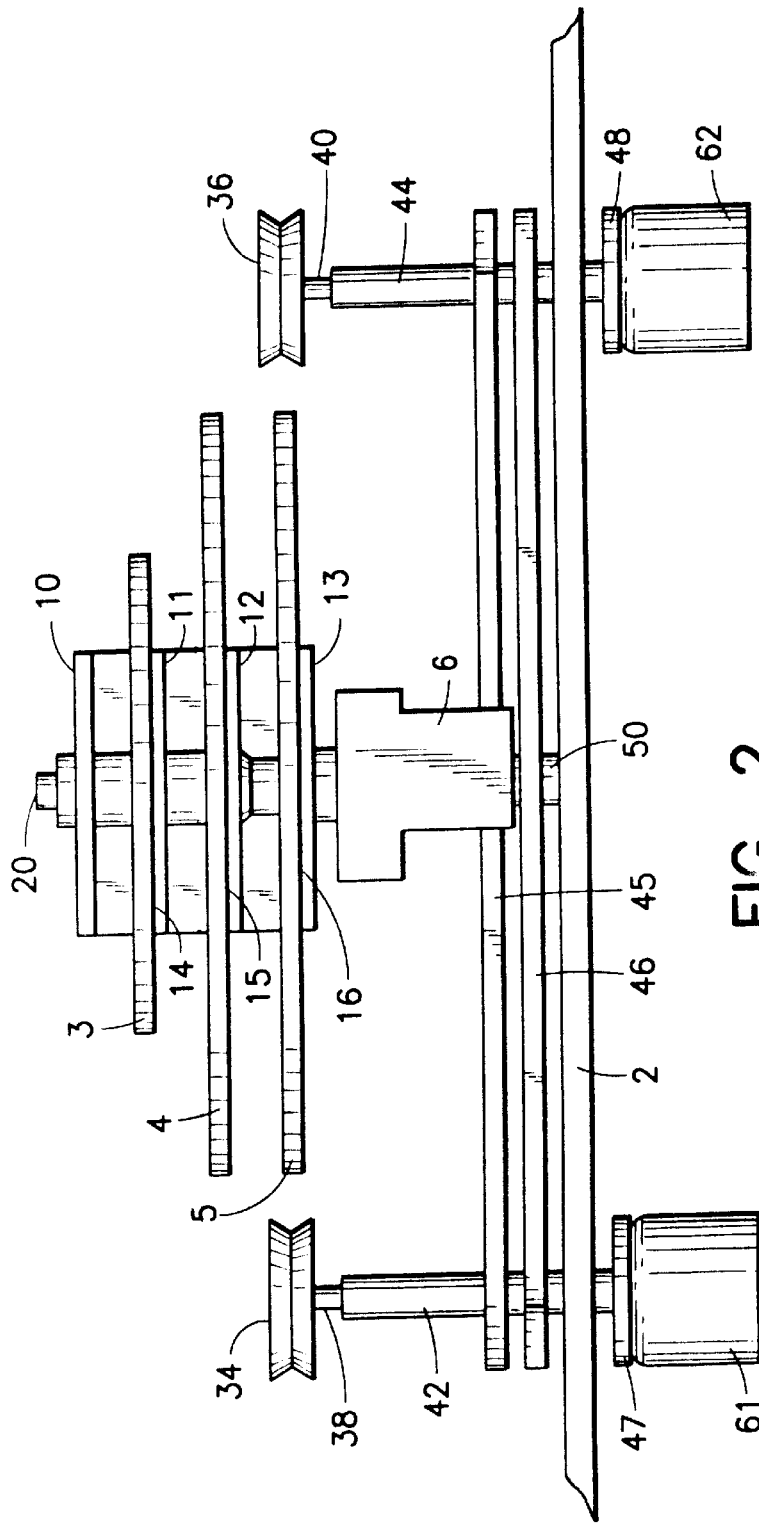
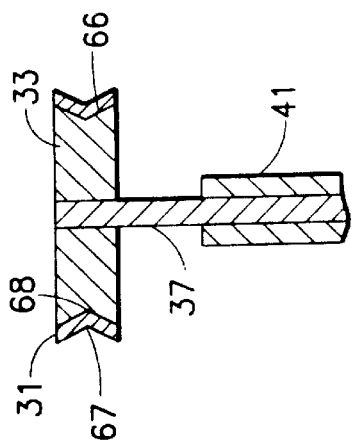
FIG. 2
FIG. 3

DISK PLAYBACK DEVICE

This application is a continuation of application Ser. No. 08/518,415, filed Aug. 23, 1995, now abandoned.

BACKGROUND OF THE INVENTION

The present invention relates to a disk playback device that uses at least one endless drive belt to transport a disk between a storage position, a disk playback position, and an eject position. More specifically the present invention relates to such disk players that store disks in a storage device with a minimal vertical clearance requirement.

Disk playback devices that transport disks between a storage position, a disk playback position, and an eject position are known. Japanese Examined Patent Publication No. 7-7560 and corresponding U.S. Pat. No. 5,123,001 show a changer-type, disk playback device with a stocker capable of storing multiple disks. A transfer mechanism of the disk playback device transfers disks between an eject position, a playback position, and the stocker. The transfer mechanism has a tray that supports the carriage. The tray transports the disk by moving the carriage, with the disk supported thereon, between the eject position and the playback position.

When disks are stored in the stocker of the device of references '7560 and '001, the carriages are stored with them. Since the carriages occupy space, added vertical clearance must be allocated to accommodate them. This limits the ability of the designer to make the disk player as compact as might be possible if the carriages were not stored in the stocker with the disks.

In addition, disk playback devices that use at least one drive belt for transporting disks are known. Devices described in Japanese Utility Model Laid-open Publication No. 60-106250 and Japanese Utility Model Laid-open Publication No. 61-24851 each use a pair of endless drive belts for transporting disks between eject playback, and stocker positions. Japanese Laid-open Patent No. 62-47893 also discloses an invention that uses a single endless drive belt to transport disks between a stocker and a playback position.

In Japanese Utility Model Laid-open Publication Nos. 60-106250 and 61-24851, and Japanese Laid-open Publication No. 62-47893, a belt-driven transport mechanism, of a disk player, transfers disks between two positions; one inside a storage mechanism and one outside the storage mechanism. The transport mechanism does not have the ability to eject the disk.

Thus, none of the above prior art devices shows a mechanism for transporting disks between eject, playback, and storage positions.

In addition, in two of the prior art devices at least one of the belts is moved aside to release the disk. In these devices, the moved belt is pivoted at one of the end supports causing it to swing in a wide arc to one side. This requires a great deal of clearance, which forces the designer to accommodate extra space to allow the belt, and its support, to swing.

OBJECTS AND SUMMARY OF THE INVENTION

It is an object of the invention to overcome the drawbacks of the prior art.

It is another object of the invention to provide a drive system for variable sized disks.

It is another object of the present invention to provide a disk player with at least one endless belt drive that transports disks between a store position, a playback position and an eject position.

It is another object of the present invention to provide a disk player with a disk transport mechanism that moves the endless belt drive away from the disks without using a large space along a plane parallel to the disk.

Briefly stated, a disk playback device has at least one endless drive belt stretched along the direction of disk transport, between a store position, a playback position and an eject position. The endless drive belt is transferred in a direction perpendicular to the direction of disk transport along a plane parallel to said disk, allowing the drive belt to move away from said disk rim without requiring a large space parallel to the disk.

According to an embodiment of the present invention, there is disclosed, a changer-type disk playback device comprising a chassis, a stocker on said chassis for holding a plurality of disks, disk playback means for playing back one of said plurality of disks, at least one endless drive belt rotatably supported by said chassis, said at least one endless drive belt being supported at least two points of said chassis to form at least one taut portion running between said at least two points, said taut portion running along a direction of disk transfer, between a disk storage position within said stocker, a playback position at said disk playback means, and an eject position, said taut portion engaging with a rim of said one of said plurality of disks, whereby said one of said plurality of disks is moved between said storage, playback, and eject positions when said at least one endless drive belt is rotated, and drive means for rotating said at least one endless drive belt.

According to another embodiment of the present invention, there is described, a disk transfer device comprising means for playing back disks, means for transporting a disk between a playback position at said means for playing back disks and an eject position, said means for transporting including a drive belt held taut alongside a path of transport of said disk, said playback and eject positions lying along said path of transport, means for engaging a rim of said disk with said drive belt, means for rotating said drive belt, whereby said disk is moved along said path of transport when said rim is engaged with said drive belt and said drive belt is rotated, drive means for rotating said drive belt, and transferring means for transferring said drive belt in a direction perpendicular to said path of transport, whereby said drive belt is moved away from said rim.

According to another embodiment of the present invention, there is described, a changer-type disk playback device comprising a chassis, a stocker movably mounted on said chassis so that said stocker can move vertically, said stocker having means for storing a plurality of disks, means for playing back a selected on of said plurality of disks, an endless drive belt, means for engaging said endless drive belt with a rim of said disk, means for supporting said endless drive belt at two points of said chassis so that a free-spanning portion runs between said two points, said free-spanning portion being parallel to a path of travel along which said disk is moved, said path of travel connecting a disk storage position within said stocker, a playback position, at said disk playback means, and an eject position, drive means for rotating said endless drive belt, whereby said disk engaged with said endless drive belt is caused to move along said path of travel, means opposite said drive belt for supporting said rim at first point of said rim opposite a second point of said rim at which said drive belt contacts said rim to engage said rim, and said means for supporting including means for urging said disk against said drive belt.

According to another embodiment of the present invention, there is disclosed, a changer-type disk playback device, comprising a vertically movably mounted stocker for storing a plurality of disks, a pair of endless drive belts, stretched parallel to each other, each of said pair of endless drive belts having an inner and an outer surface, transferring means for moving said pair of endless drive belts toward and away from each other, such that a portion of said outer surface of each one of said pair of endless drive belts engages one of two opposing positions on a rim of a disk, driving means for rotating at least one of said pair of endless drive belts, such that said disk is transported between a disk storage position, a disk playback position and an eject position, means for playing back said selected disk while said selected disk is in said playback position, and said transferring means being effective for keeping said endless drive belts parallel when said endless drive belts are moved toward and away from each other.

According to yet another embodiment of the present invention, there is disclosed, a changer-type disk playback device, comprising a longitudinal drive member having a portion with a surface, means for moving said surface along a direction of travel of a disk, a support member, opposite said surface, for urging an edge of said disk against said surface, whereby said disk is moved in said direction of travel when said surface is moved, said disk moving from a storage position, to a playback position upon a moving of said surface, said disk moving from said playback position to an eject position upon a further moving of said surface, said drive member and said support member being separated by a first distance when said support member urges said edge of said disk against said surface, and means for separating said drive member and said support member by a distance greater than said first distance, whereby said disk is no longer urged against said surface.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2 is a front-view of the disk playback device.

FIG. 3 is a cross-section view along the A—A line in FIG. 1.

FIG. 12(*b*) is a view showing a disk and disk position restricting means as the disk is being transported into the stocker.

FIG. 12(*c*) is a view showing a disk and disk position restricting means after it has been transported into the stocker.

DETAILED DESCRIPTION OF THE PREFERRED EMBODIMENTS

Figure 1:
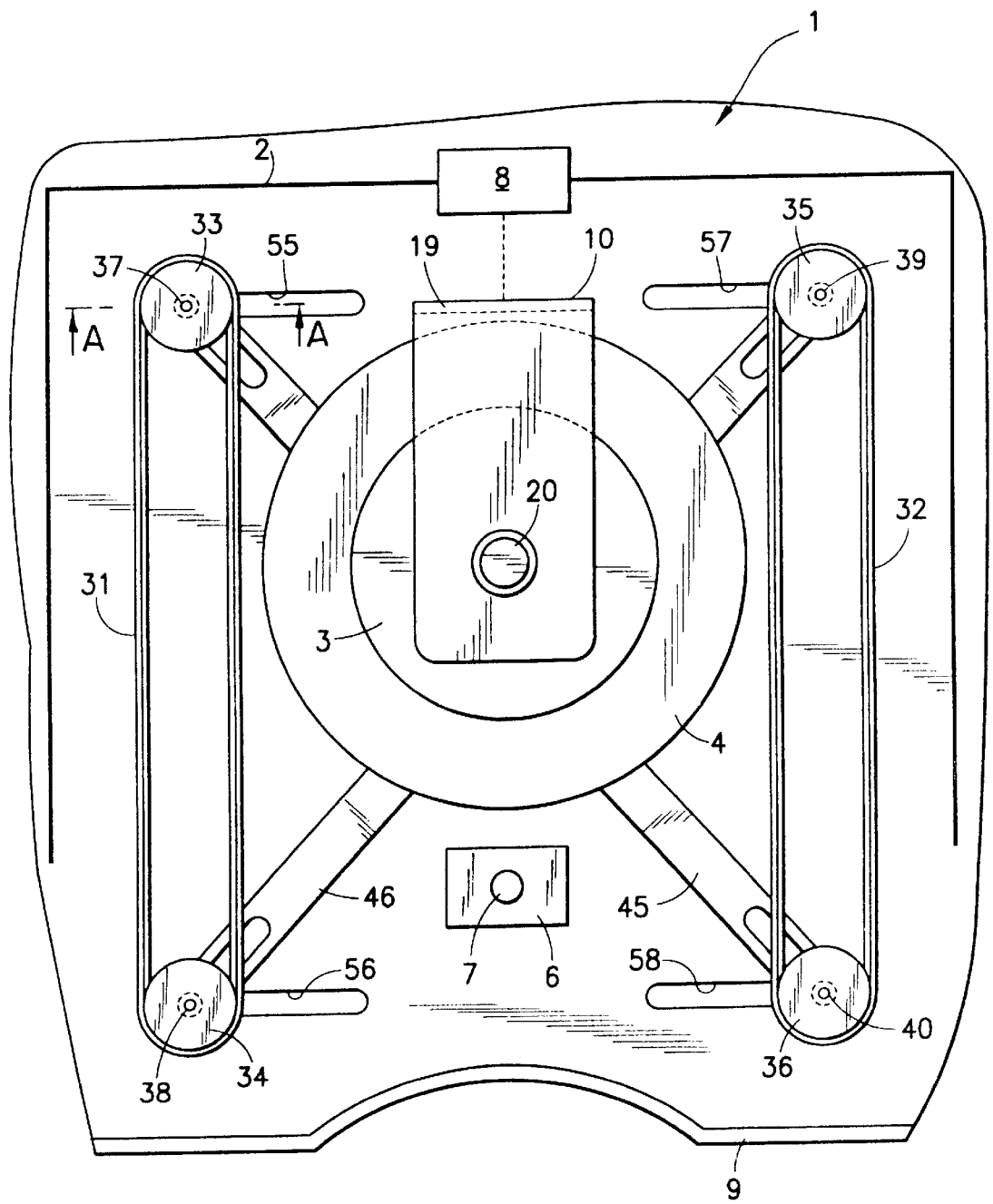
FIG. 1 is a plan of the disk playback device.

Referring to FIG. 1, a changer-type disk playback device 1 holds three disks. Disk playback device 1 has a chassis 2 and a front panel 9. Front panel 9 has a slit-shaped opening (not shown in the drawings) for receiving and ejecting one of the disks.

Referring also to FIG. 2, disk playback device 1 also includes a stocker 10 in which an 8 cm. disk 3, having an outer diameter of 8 cm., and first and second 12 cm. disks 4 and 5, having outer diameters of 12 cm., are stored. Eight cm. disk 3 and first and second 12 cm. disks 4 and 5 are concentrically aligned within stocker 10. A stocker transferring mechanism 8 is positioned to move stocker 10 vertically (ie, perpendicular to the plane of FIG. 1) relative to chassis 2. Additionally, mounting plates 11, 12, and 13, on which 8 cm. disk 3 and first and second 12 cm. disks 4 and 5 are mounted, attach to a vertical wall 19 at the rear end of stocker 10. Upper surfaces 14, 15, and 16 of mounting plates 11,12, and 13 support 8 cm. disk 3 and first and second 12 cm. disks 4 and 5, respectively.

An endless drive belt 31 is supported by a drive pulley 33 and a driven pulley 34. Another endless drive belt 32 is supported by a drive pulley 35 and a driven pulley 36. Endless drive belts 31 and 32 are held taut by respective pulleys creating straight spanning portions of drive belts 31 and 32 between them. Endless drive belts 31 and 32 are parallel. Endless drive belts 31 and 32 each have an inner surface (not labeled) facing an inside of the player and an outer surface (not labeled) facing an outside of the device. Drive pulleys 33 and 35 and driven pulleys 34 and 36 are slidably supported such that endless drive belts 31 and 32 move toward and away from each other while remaining parallel.

Figure 9:
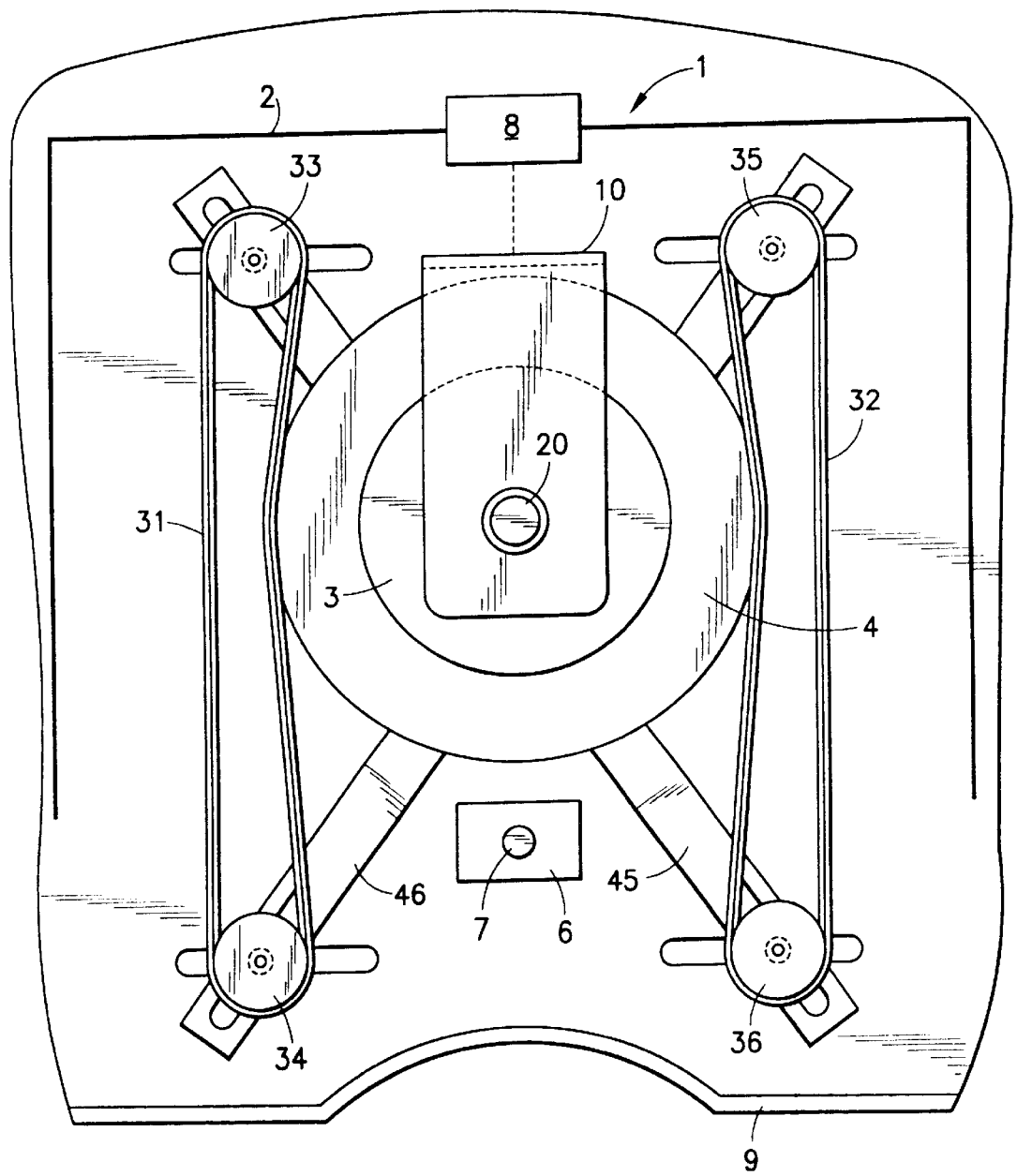
FIG. 9 is a plan view of the disk playback device showing the pair of drive belts holding a disk.

Referring to FIG. 9, endless drive belts 31 and 32 support a selected disk, such as first 12 cm. disk 4, by embracing a rim thereof. Endless drive belts 31 and 32 move toward first 12 cm. disk 4 until each of endless drive belts 31 and 32 contact the rim of first 12 cm. disk 4. Once endless drive belts 31 and 32 make contact with the rim, pulley pairs 33–34 and 35–36, are driven slightly further causing endless drive belts 31 and 32 to bow. In this position, the distances between drive pulleys 33 and 35 is less than the diameter of first 12 cm. disk 4. Since endless drive belts 31 and 32 are of a resilient material, endless belts 31 and 32 are urged toward each other against the rim of first 12 cm. disk 4, to support first 12 cm. disk. Endless drive belts 31 and 32 transport first 12 cm. disk 4 within disk playback device 1 by rotating in the same direction while supporting first 12 cm. disk 4 between them. When first 12 cm. disk 4 is in the playback position, endless drive belts 31 and 32 rotate in opposite directions while supporting first 12 cm. disk 4, causing first 12 cm. disk 4 to rotate.

In an alternative embodiment, only one of the endless drive belts 31 and 32 is rotated to transport the disk between the eject, playback and stocker positions. In this embodiment, the disk is rolled against the stationary one of the endless drive belts 31 and 32. Thus only one motor is required for disk transport.

Referring to FIG. 3, drive pulley 33 has a V-shaped groove 66 along its rim. Endless drive belt 31 is reeved around V-shaped groove 66. Endless drive belt 31 has a V-shaped cross-section so that it presents a concave V-shaped groove 67 on its outer perimeter and a convex V-shaped surface 68 on its inner perimeter. Convex V-shaped surface 68 engages with V-shaped groove 66 of drive pulley 33. Drive pulley 35 and driven pulleys 34 and 36 have the same shape as drive pulley 33. Endless drive belt 32 has the same shape as endless drive belt 31.

Figure 4:
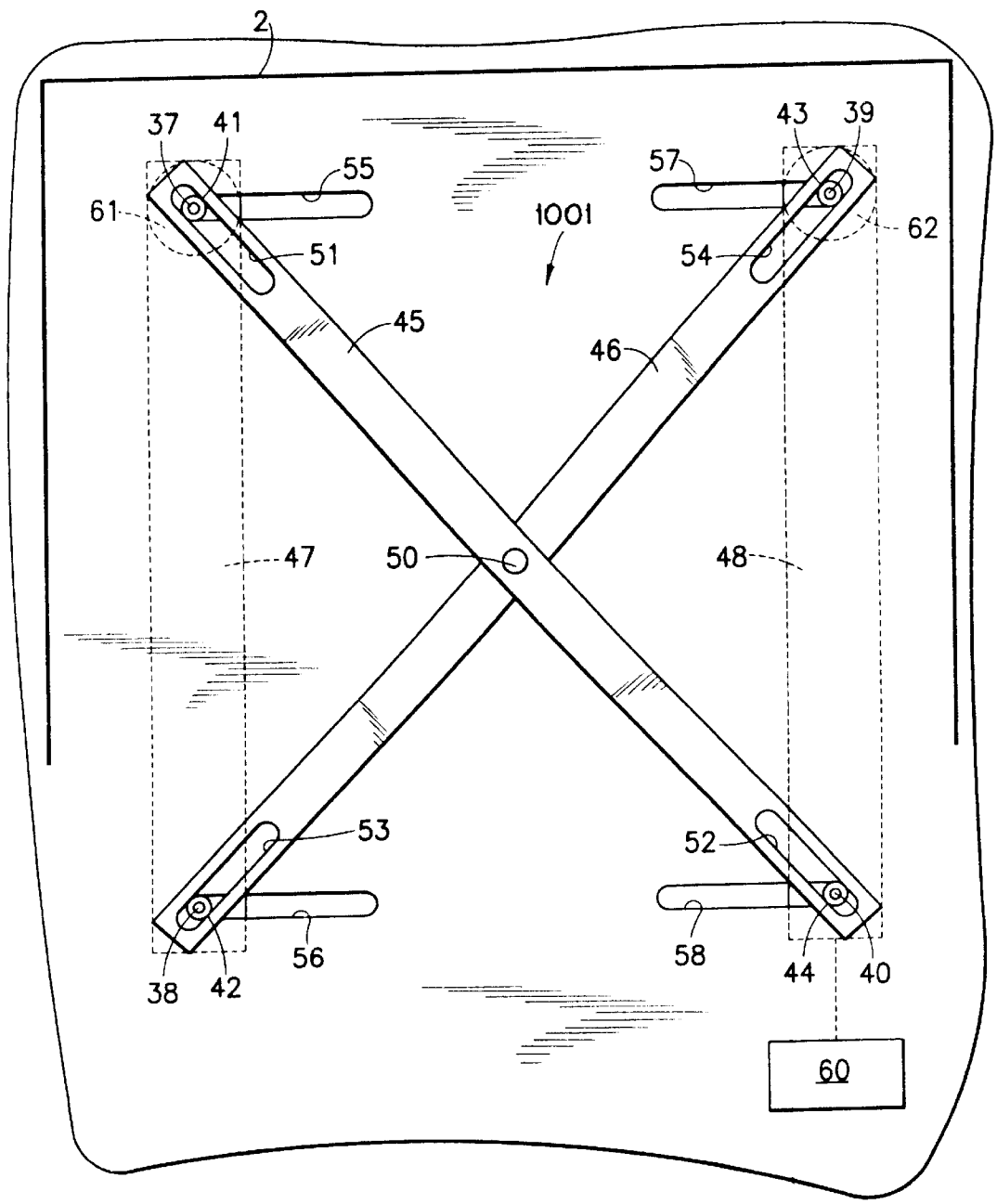
FIG. 4 is a plan view of the disk playback device shown in FIG. 1 where stocker 10, drive belts 31 and 32, drive pulleys 33 and 35, and driven pulleys 34 and 36 are omitted.

Referring now also to FIG. 4, spanning portions of drive belts 31 and 32 are kept parallel by a translation mechanism 1001. Drive pulley shafts 37 and 39 and driven pulley shafts 38 and 40 support drive pulleys 33 and 35 and driven pulleys 34 and 36, respectively. Drive pulley shafts 37 and 39 and driven pulley shafts 38 and 40 are supported by bearings 41, 43, 42 and 44, respectively. Bearings 41 and 42 are affixed on opposing ends of a longitudinal sliding plate 47 on a left side of chassis 2. Bearings 43 and 44 are fixed on opposing ends of a longitudinal sliding plate 48 on a right side of chassis 2.

Chassis 2 has slots 55–58 running perpendicular to longitudinal axes of sliding plates 47 and 48. Bearings 41–44 are upwardly insert through slots 55–58, respectively.

A pair of longitudinal rotating arms 45 and 46 are rotatably supported at their centers on a shaft 50 attached to chassis 2. Longitudinal slots 51 and 52 pierce opposing ends of longitudinal rotating arm 45. Slots 51 and 52 are equidistant from a center of rotating arm 45 with their longitudinal axes parallel to the axis of rotating arm 45. Bearings 41 and 44 insert into slots 51 and 52, respectively. Similarly, longitudinal slots 53 and 54 pierce opposing ends of longitudinal rotating arm 46. Slots 53 and 54 are equidistant from a center of rotating arm 46 with their longitudinal axes parallel to the axis of rotating arm 46. Bearings 42 and 43 insert into slots 53 and 54, respectively.

Sliding plates 47 and 48 move parallel to each other. The line connecting the axes of drive pulley shaft 37 and driven pulley shaft 38 is always parallel to the line connecting the axes of drive pulley shaft 39 and driven pulley shaft 40. Thus, drive belts 31 and 32 remain parallel as drive pulleys 33 and 35 and driven pulleys 34 and 36 are moved.

A drive belt transfer mechanism 60 is connected to sliding plate 48. Drive belt transfer mechanism 60 moves sliding plate 48. Sliding plate 47, connected by rotating arms 45 and 46 to sliding plate 48, moves the same amount as sliding plate 48. Thus, drive belts 31 and 32 are moved equal distances closer or further away from each other. Motors 61 and 62 are attached to sliding plates 47 and 48 respectively. The shafts of motors 61 and 62 pass through bearings 41 and 43 and connect to shafts 37 and 39 of drive pulleys 33 and 35, respectively (drive pulleys 33 and 35 are not shown in FIG. 4). Motors 61 and 62 power drive pulleys 33 and 35, respectively, to transport and rotate the disk.

Referring to FIG. 1, an optical pickup 6 having an object lens 7 is affixed to chassis 2 for optical playback of data recorded on 8 cm. disk and first and second 12 cm. disks 3, 4, and 5. Data is recorded in the form of spiral tracks. The tracks are followed using a well-known tracking servo-mechanism to follow the light reflected from the track and received by optical pickup 6. As the spiral track is followed, optical pickup 6 moves relative to the disk being played back, from the disk's inner perimeter to its outer perimeter.

Optical pickup 6 is affixed to chassis 2. Disk 4 moves in a radial direction, during playback, relative to optical pickup 6. Since optical pickup 6 is fixed, no transfer mechanism for moving optical pickup 6 is required. Therefore, mechanical vibration caused by such a transfer mechanism is not transmitted to optical pickup 6, providing very stable relative positioning between optical pickup 6 and disk 4. Since drive belts 31 and 32 also rotate disk 4 for playback, the same drive system is used for both disk transport and playback, making the device cheaper to make.

Figure 5:
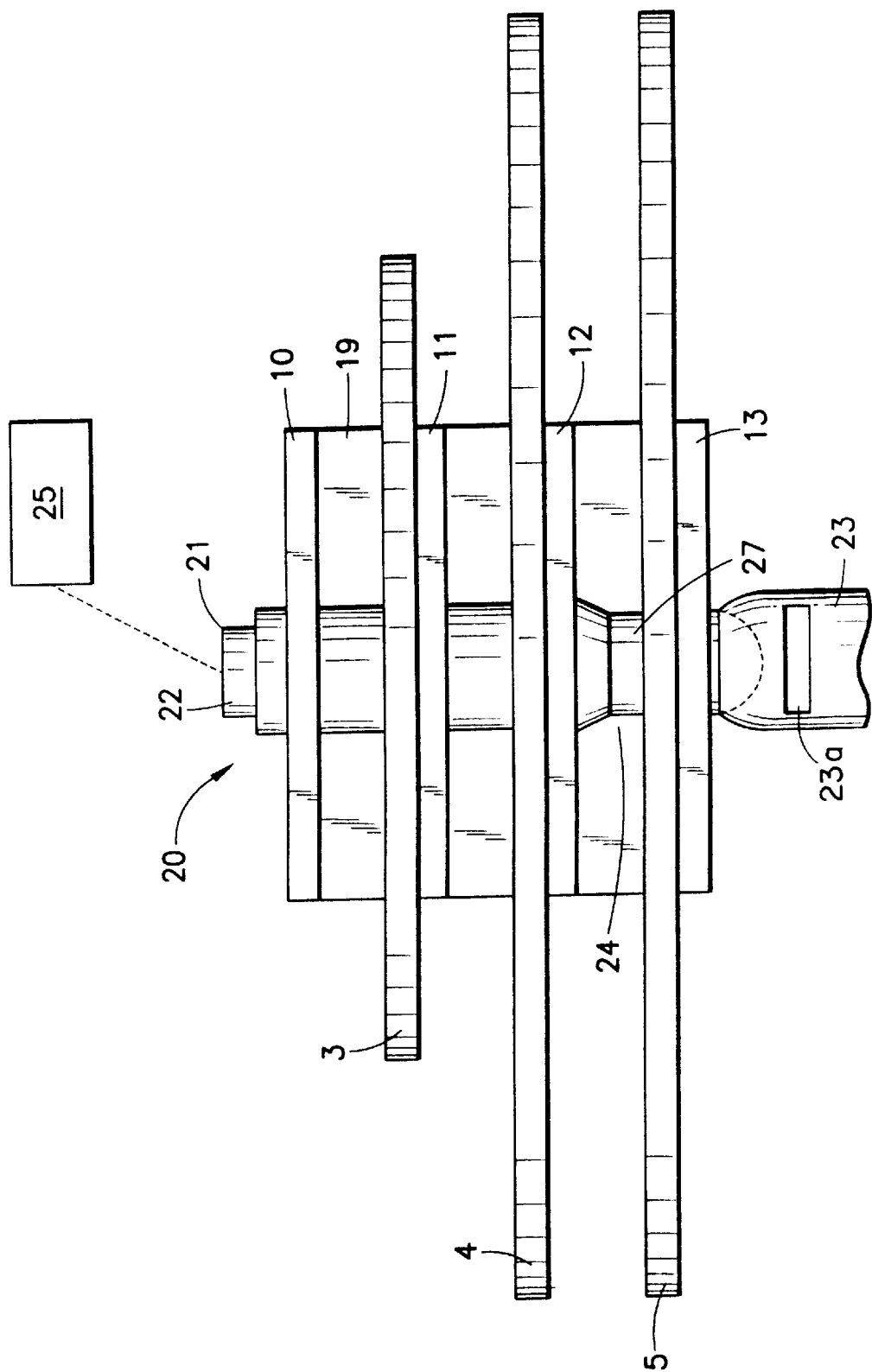
FIG. 5 is a schematic front-view showing a disk position restricting means.
Figure 6:
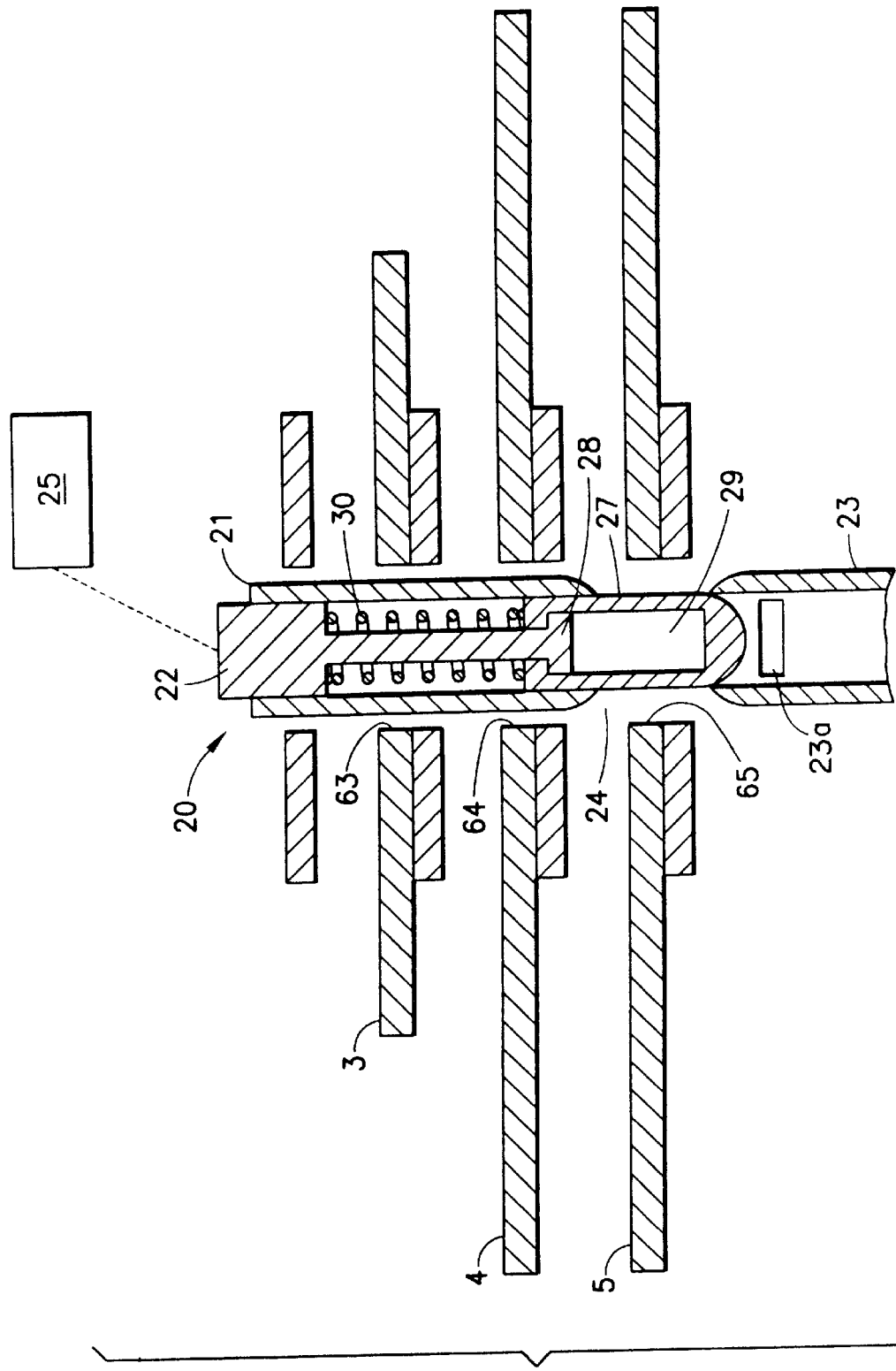
FIG. 6 is a cross-section view of the disk position restricting means of FIG. 5.

Referring to FIGS. 5 and 6, a disk position restricting means 20 restricts the positions of 8 cm. disk 3 and first and second 12 cm. disks 4 and 5 within stocker 10. Disk position restricting means 20 includes a hollow upper shaft 21 affixed to chassis 2. A transfer shaft 22 is moved inside upper shaft 21 by a shaft transfer mechanism 25. A hollow lower shaft 23 is affixed to chassis 2. Hollow lower shaft 23 shares an axis with upper shaft 21. Disks pass through a gap 24 between upper shaft 21 and lower shaft 23 during movement of disks to and from stocker 10.

Disk position restricting means 20 also includes a regulating shaft 27, which is urged away from transfer shaft 22 by a spring 30. A large-diameter section 28 on the tip of transfer shaft 22 inserts into an inner space 29 of regulating shaft 27. Regulating shaft 27, transfer shaft 22, and spring 30 can move within upper shaft 21. When in the position shown in FIG. 6, transfer shaft 22 is moved by shaft transfer mechanism 25 to a lowered position. This causes the tip of regulating shaft 27 to be inserted into the hollow portion of lower shaft 23 bridging gap 24.

Upper shaft 21 and lower shaft 23 pass through center holes 63, 64, and 65 of 8 cm. disk 3 and 12 cm. disks 4 and 5 in stocker 10. Center holes 63, 64, and 65 have the same inner diameters. Therefore, upper shaft 21 or lower shaft 23 pass through center holes 63, 64, and 65 of 8 cm. disk 3 and first and second 12 cm. disks 4 and 5 to locate and secure the disks precisely within stocker 10. Regulating shaft 27 bridges gap 24. Thus, upper shaft 21 restricts the motion of disks 3 and 4 and regulating shaft 27 restricts the motion of second 12 cm. disk 5.

Figure 8:
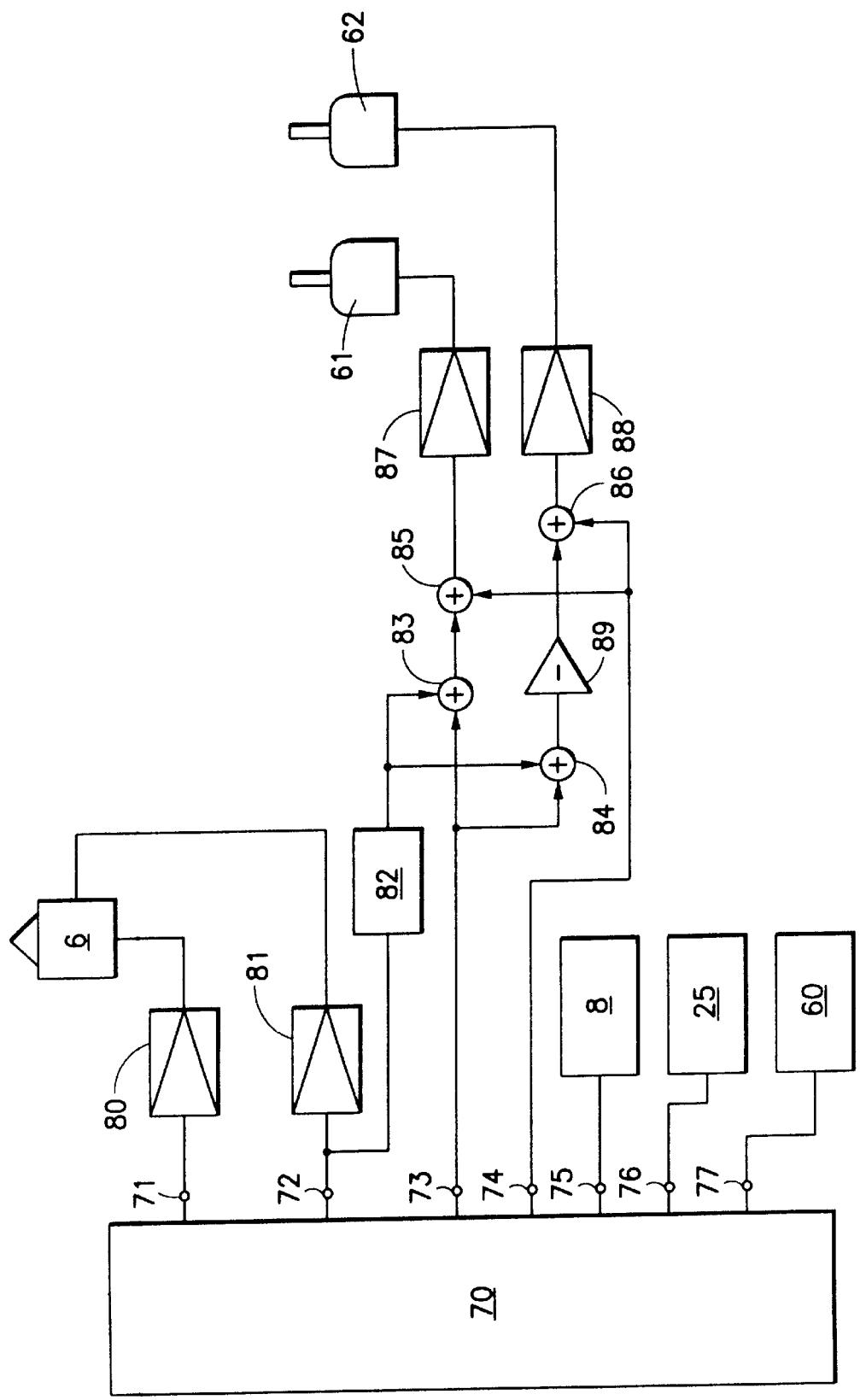
FIG. 8 is a block diagram of the circuit controlling the motors which drive the drive belts.

Referring to FIG. 8, a control circuit for disk playback device 1 includes a microprocessor 70. Microprocessor 70 outputs a focus servo-mechanism signal from output terminal 71 to move optical lens 7 of optical pickup 6 toward and away from the recorded surface of disks 3, 4, and 5 to bring the data tracks into focus. Microprocessor 70 also outputs a tracking servo-mechanism signal at output terminal 72. The tracking servo-mechanism signal is used to move optical lens 7 radially to maintain tracking of the spiral data tracks.

The servo-mechanism signals from output terminals 71 and 72 move object lens 7 in predetermined directions via drive circuits 80 and 81 respectively. A low-pass filter (hereinafter referred to as LPF) 82, connected to terminal 72, extracts a DC component of the tracking servo-mechanism signal. The DC element is applied to adder circuits 83 and 84.

Output terminal 73 applies a disk transfer signal, to transport disks within device 1. When a disk is to be moved from the eject position toward stocker 10, a positive voltage, of a predetermined level, is output. When the disk is to be transported from stocker 10 toward the eject position, a negative voltage, of the same level, is output. The disk transfer signals are applied to first and second adder circuits 83 and 84 respectively. The output from first adder circuit 83 is applied to a third adder circuit 85. An output of second adder circuit 84 is applied to a fourth adder circuit 86 whose output is, in turn, applied to invertor 89.

In an alternative embodiment, the transfer signal is applied to only one of the motors 61 and 62 such that one of the endless drive belts 31 and 32 rotates to move the disk between the eject position and stocker 10.

Output terminal 74 of microprocessor 70 outputs a constant linear velocity (CLV) servo-mechanism signal, to regulate the speed of rotation of the disk. As is well known in the art, the CLV servo-mechanism signal maintains the disk's speed at a predetermined level using a phase difference between a synchronization signal, included in the playback signal from optical pickup 6, and a reference clock as the error signal of a servo-controller. This CLV servo-mechanism signal is applied to third and fourth adder circuits 85 and 86. Output voltages of third and fourth adder circuits 85 and 86 are applied to drive circuits 87 and 88, respectively, to rotate motors 61 and 62.

During transport of a disk within device 1, the voltage indicating the desired direction is output at output terminal 73 to control motors 61 and 62. In response, motors 61 and 62 rotate endless drive belts 31 and 32, respectively, to transport the disk. During disk playback, motors 61 and 62 are controlled by the DC components of both the CLV servo-mechanism signal from output terminal 74, which controls the rotational velocity of the disk, and the tracking servo-mechanism signal from output terminal 72, which translates the disk relative to optical pickup 6 to track the spiral data track.

Output terminal 75 of microprocessor 70 is applied to stocker transfer mechanism 8 to control stocker transfer mechanism 8. Output terminal 76 is applied to shaft transfer mechanism 25 to control shaft transfer mechanism 25. Output terminal 77 is applied to drive belt transfer mechanism 60 to control drive belt transfer mechanism 60.

Referring to FIGS. 1 and 4, second 12 cm. disk 5, is stored in the lowermost position of stocker 10. Microprocessor 70 applies a control signal through output terminal 77 to drive belt transfer mechanism 60. Drive belt transfer mechanism 60 moves sliding plate 48 to the left along slots 57 and 58 in chassis 2. Simultaneously and consequently, sliding plate 47, connected to sliding plate 48 by rotating arms 45 and 46, moves toward the right along slots 55 and 56. Therefore, sliding plates 47 and 48 move toward each other while remaining parallel. Since drive belts 31 and 32 are carried on sliding plates 47 and 48, respectively, drive belts 31 and 32 are also move toward each other.

Referring to FIG. 9, endless drive belts 31 and 32 support the outer rim of second 12 cm. disk 5. Sliding plates 47 and 48 are moved to positions such that the separation distance between drive pulleys 33 and 35 and driven pulleys 34 and 36, respectively, is less than the outer diameter of second 12 cm. disk 5. Thus, endless drive belts 31 and 32 bow and wrap partially around a portion of the outer rim of 12 cm. disk 5.

Figure 7:
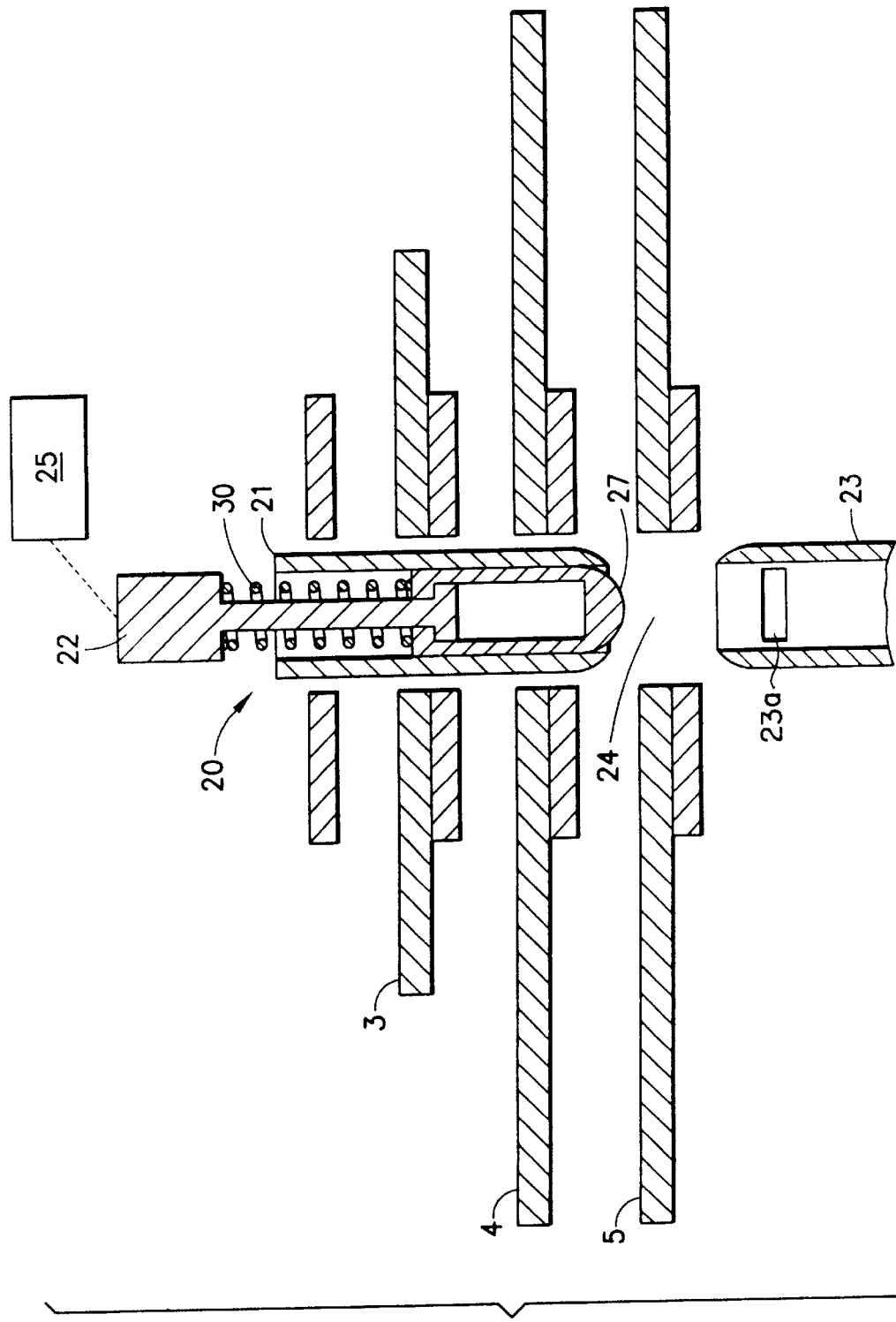
FIG. 7 is a cross-section view showing disk position restricting means of FIG. 5 when a gap is opened.

Referring to FIGS. 7 and 8, microprocessor 70 sends a control signal from output terminal 76 to control shaft transfer mechanism 25 before transferring second 12 cm. disk 5 to the playback position. Shaft transfer mechanism 25 moves transfer shaft 22 upward to pull regulating shaft 27 into upper shaft 21. As a result, gap 24 between upper shaft 21 and lower shaft 23 is cleared for disk passage.

Microprocessor 70 sends a disk transfer signal having a predetermined negative voltage through output terminal 73. This causes motor 61 to rotate clockwise and motor 62 to rotate counterclockwise. This causes spanning portions of endless drive belts 31 and 32, that engage second 12 cm. disk 5, to move in the same direction pulling second 12 cm. disk 5 out of stocker 10 toward the playback position.

Figure 10:
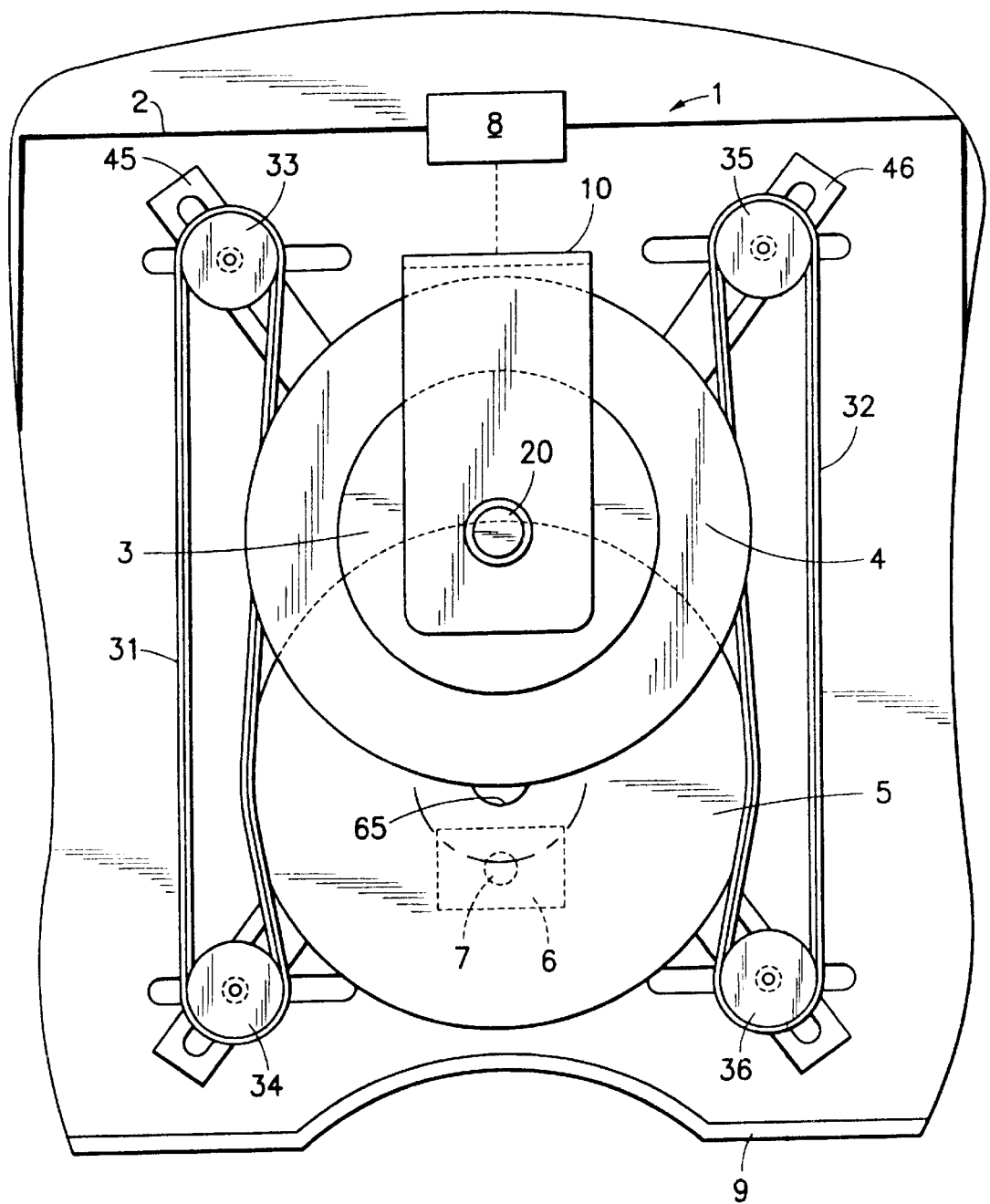
FIG. 10 is a plan view of the disk playback device showing a disk in an initial playback position.

Referring to FIG. 10, second 12 cm. disk 5 is brought to the initial playback position. At this position, object lens 7 of optical pickup 6 is at the innermost position of the recorded area, indicated by the dotted line on optical lens 7. When second 12 cm. disk 5 is brought to the indicated position, microprocessor 70 sends a positive CLV servo-mechanism signal from output terminal 74 to rotate motors 61 and 62 counterclockwise. This rotates the spanning portions of drive belts 31 and 32 engaging second 12 cm. disk 5 in opposite directions, causing second 12 cm. disk 5 to rotate clockwise at an appropriate speed.

A laser beam emitted from object lens 7 is focused on the recorded surface of second 12 cm. disk 5 and is moved to track the data track on second 12 cm. disk 5. Thus, the focus servo-mechanism moves object lens 7 axially with respect to the disk in response to movement of the disk surface of second 12 cm. disk 5. The tracking servo-mechanism moves object lens 7 radially with respect to second 12 cm. disk 5, in response to minor eccentric movements of second 12 cm. disk 5 or track nonuniformities.

The track on second 12 cm. disk 5 forms a spiral shape. Thus, as playback proceeds, object lens 7 gradually moves outward with respect to second 12 cm. disk 5. The velocities of drive belts 31 and 32 are simply the linear velocity of the recorded surface v, multiplied by the ratio of the radius of the disk $r_d$ to the radius of the current track $r_t$ at time t after beginning the reading of the innermost track. The values of $r_t$, t, and v are related to the track pitch of the recorded surface p and the radius of the innermost track $r_i$ as:

$$vpt = \pi(r_t^2 - r_i^2)$$

and therefore $r_t$ is:

$$r_t = \sqrt{r_i^2 + vpt/\pi}$$

Thus, the velocity of the belt changes substantially with the radius of the track being read.

Since object lens 7 must gradually move outwardly to maintain alignment with the track, a DC component appears in the tracking servo-mechanism signal. Referring to FIG. 8, the DC component is extracted by LPF 82 and applied to motor 61, through first and third adder circuits 83 and 85, and drive circuit 87. The DC component is also applied to motor 62, through second adder circuit 84, invertor 89, fourth adder circuit 86 and drive circuit 88. Thus the voltages sent to motor 61 and 62 are identical when the disk is rotated solely by the CLV servo-mechanism signal.

To change the position of the disk being read, the voltages applied to motors 61 and 62 are changed to lower the speed of motor 62 relative to motor 61. In response to the change in speed of motors 61 and 62, the speed of drive belt 31 increases relative to the speed of drive belt 32. This causes the center of rotation of second 12 cm. disk 5 to move away from object lens 7 and toward stocker 10 while object lens 7 of optical pickup 6 follows the spiral track recorded on second 12 cm. disk 5.

Referring to FIG. 3, drive belts 31 and 32 have a V-shaped cross-section. The rim of second 12 cm. disk 5 engages V-shaped groove 67 of drive belts 31 and 32. During playback, drive belts 31 and 32 are also partially wrapped around the rim of second 12 cm. disk 5. This inhibits vibrations on second 12 cm. disk 5 generated during rotation.

Figure 11:
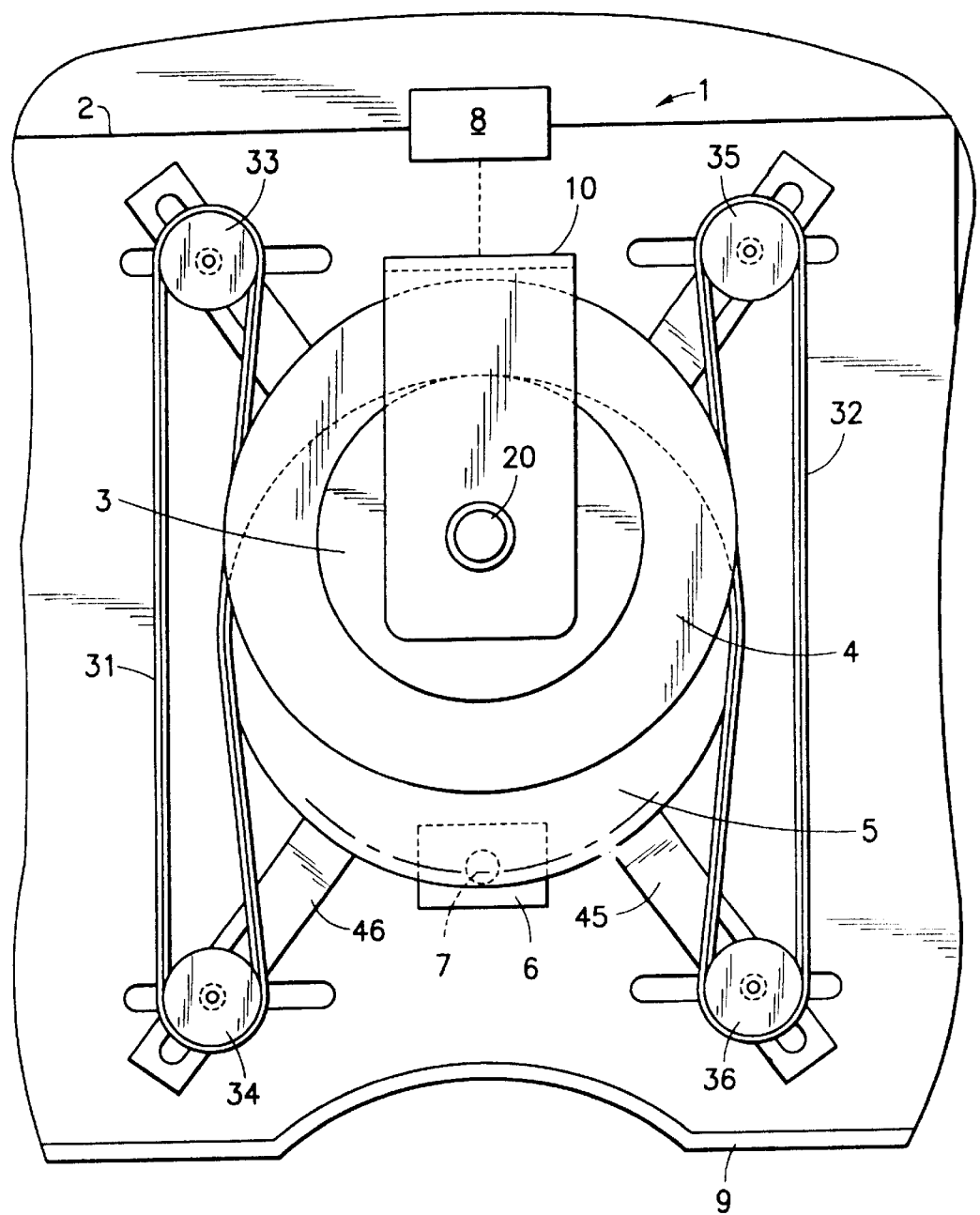
FIG. 11 is a plan view of the disk playback device a disk in a final playback position.

Referring to FIG. 11, drive belts 31 and 32 move second 12 cm. disk 5 relative to object lens 7 and optical pickup 6. When optical pickup 6 reads the outermost position of the recorded area, indicated by a double dotted line, playback of second 12 cm. disk 5 stops and a procedure to store second 12 cm. disk 5 is initiated.

Figure 12A:
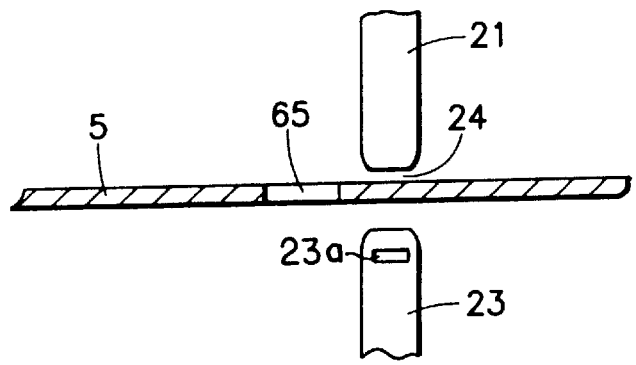
FIG. 12(*a*) is a view showing a disk in the disk playback device before being moved into the stocker.
Figure 12B:
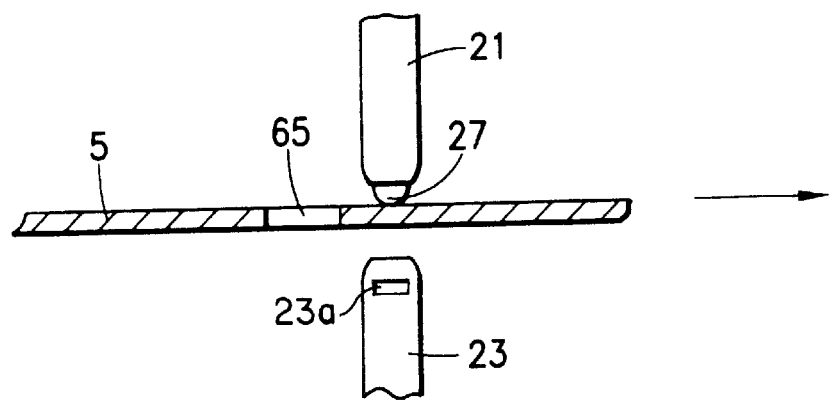
Figure 12C:
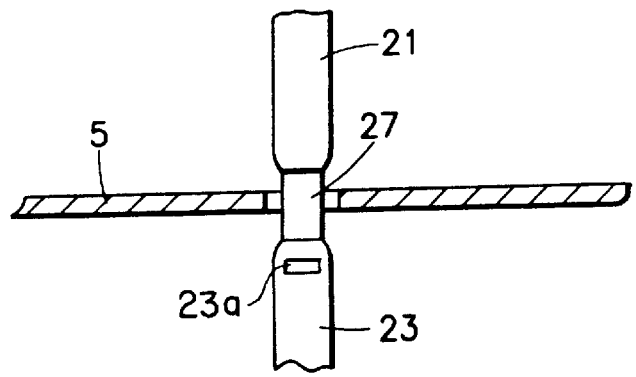
Figure 13:
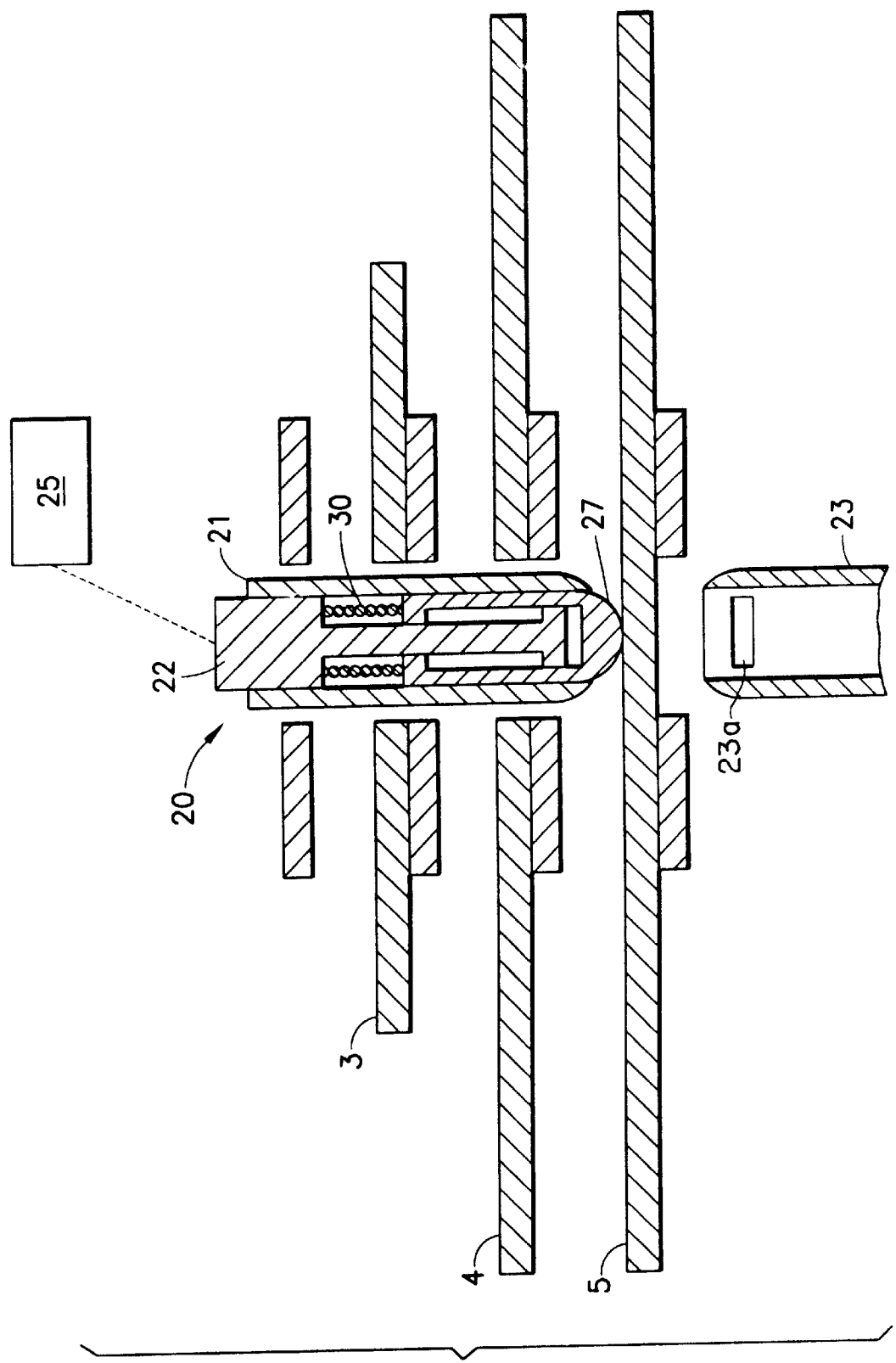
FIG. 13 is a schematic cross-section of the disk position restricting means with the regulating shaft is pressed against the disk.

Referring to FIGS. 11, 12(*a*), 12(*b*), and 12(*c*), to store second 12 cm. disk 5, initially at the final playback position, into stocker 10, regulating shaft 27 is moved into upper shaft 21. Thus gap 24 between upper shaft 21 and lower shaft 23, is cleared as shown in FIG. 12(*a*). In the final playback position, second 12 cm. disk 5 is positioned in gap 24. After playback is complete for second 12 cm. disk 5, microprocessor 70 outputs a control signal at output terminal 76. This causes transfer shaft 22 to move to the lowered position, to insert regulating shaft 27 in lower shaft 23. Since second 12 cm. disk 5 is within gap 24, the tip of the regulating shaft 27 contacts the surface of second 12 cm. disk 5 as shown in FIG. 12(*b*) and is held against the surface of second 12 cm. disk 5 by the urging of spring 30.

Referring now also to FIGS. 6 and 8, microprocessor 70 outputs a positive disk transfer signal from output terminal 73 causing endless drive belts 31 and 32 to begin moving second 12 cm. disk 5 toward the stocker (in the direction indicated by the arrow in FIG. 12(*b*)). With this movement, the tip of regulating shaft 27 slides along the surface of second 12 cm. disk 5. Once center hole 65 aligns with regulating shaft 27, regulating shaft 27 falls through center hole 65 of second 12 cm. disk 5 and inserts into lower shaft 23. A sensor 23*a* detects the insertion of regulating shaft 27 into lower shaft 23. When this insertion is detected, motors 61 and 62 and motion of second 12 cm. disk 5 are stopped.

The insertion of regulating shaft 27 through center hole 65 of second 12 cm. disk 5 secures it in position within stocker 10 and prevents it from coming out of stocker 10 due to vibrations or any other irregular movement of disk playback device 1. Eight cm. disk 3 and first 12 cm. disk 4, are positioned similarly within stocker 10 by upper shaft 21 and are also prevented from falling out of stocker 10.

Figure 14:
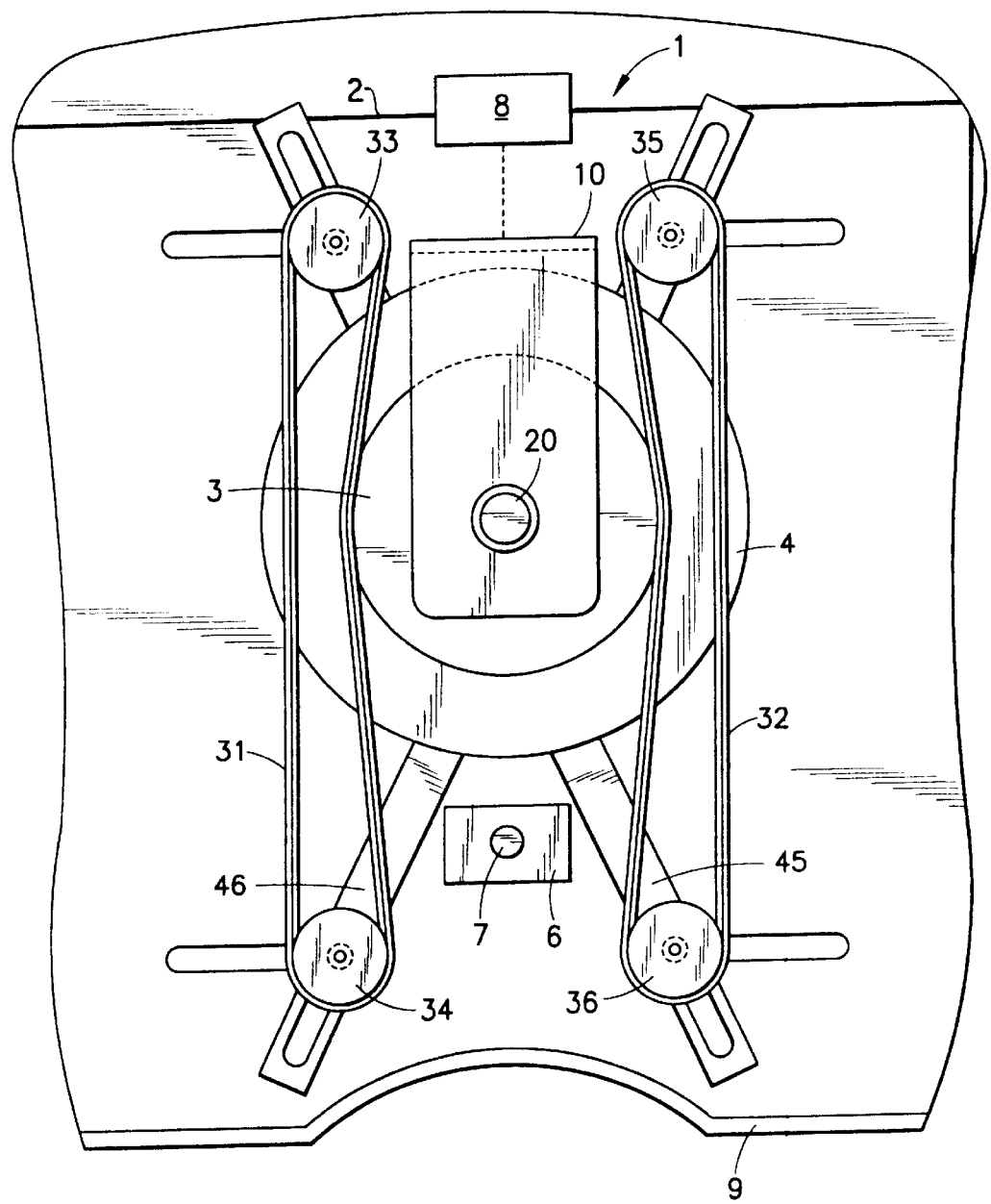
FIG. 14 is a plan view of the disk playback device showing the pair of drive belts holding an 8 cm. disk.

Referring to FIGS. 8 and 14, to play back 8 cm. disk 3 after second 12 cm. disk 5 is stored within stocker 10, microprocessor 70 sends a stocker drive signal from output terminal 75. Stocker 10 is then moved downward by stocker transfer mechanism 8 until 8 cm. disk 3 and drive belts 31 and 32 lie on the same plane. Then, microprocessor 70 sends a control signal from output terminal 77 that drives drive belt transfer mechanism 60 to adjust the distance between endless drive belts 31 and 32 until drive belts 31 and 32 are partially wrapped around 8 cm. disk 3.

Before the 8 cm. disk 3 is transported, microprocessor 70 sends a control signal from output terminal 76 to control shaft transfer mechanism 25. Shaft transfer mechanism 25 moves regulating shaft 27 into upper shaft 21 to open up gap 24 between upper shaft 21 and lower shaft 23.

Figure 15:
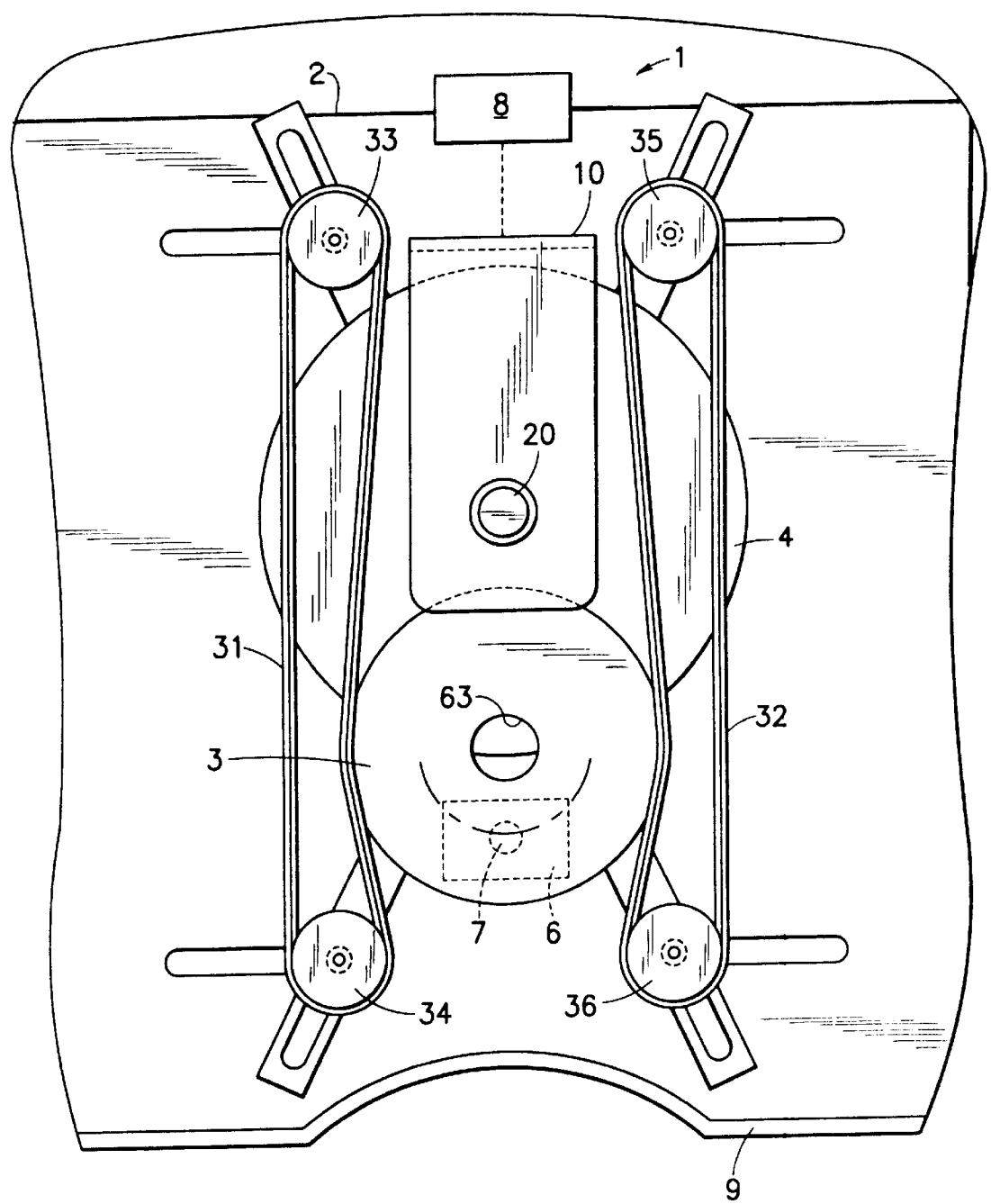
FIG. 15 is a plan view of the disk playback device showing an 8 cm. disk in the initial playback position.

Referring also to FIG. 15, microprocessor 70 then outputs a disk transfer signal, a predetermined negative voltage, at output terminal 73. This causes motor 61 to rotate clockwise and motor 62 to rotate counterclockwise, causing 8 cm. disk 3 to be pulled out from stocker 10 by drive belts 31 and 32. Eight cm. disk 3 is brought to the initial playback position and, as described above, drive belts 31 and 32 rotate 8 cm. disk 3 clockwise at an appropriate speed for playback.

Figure 16:
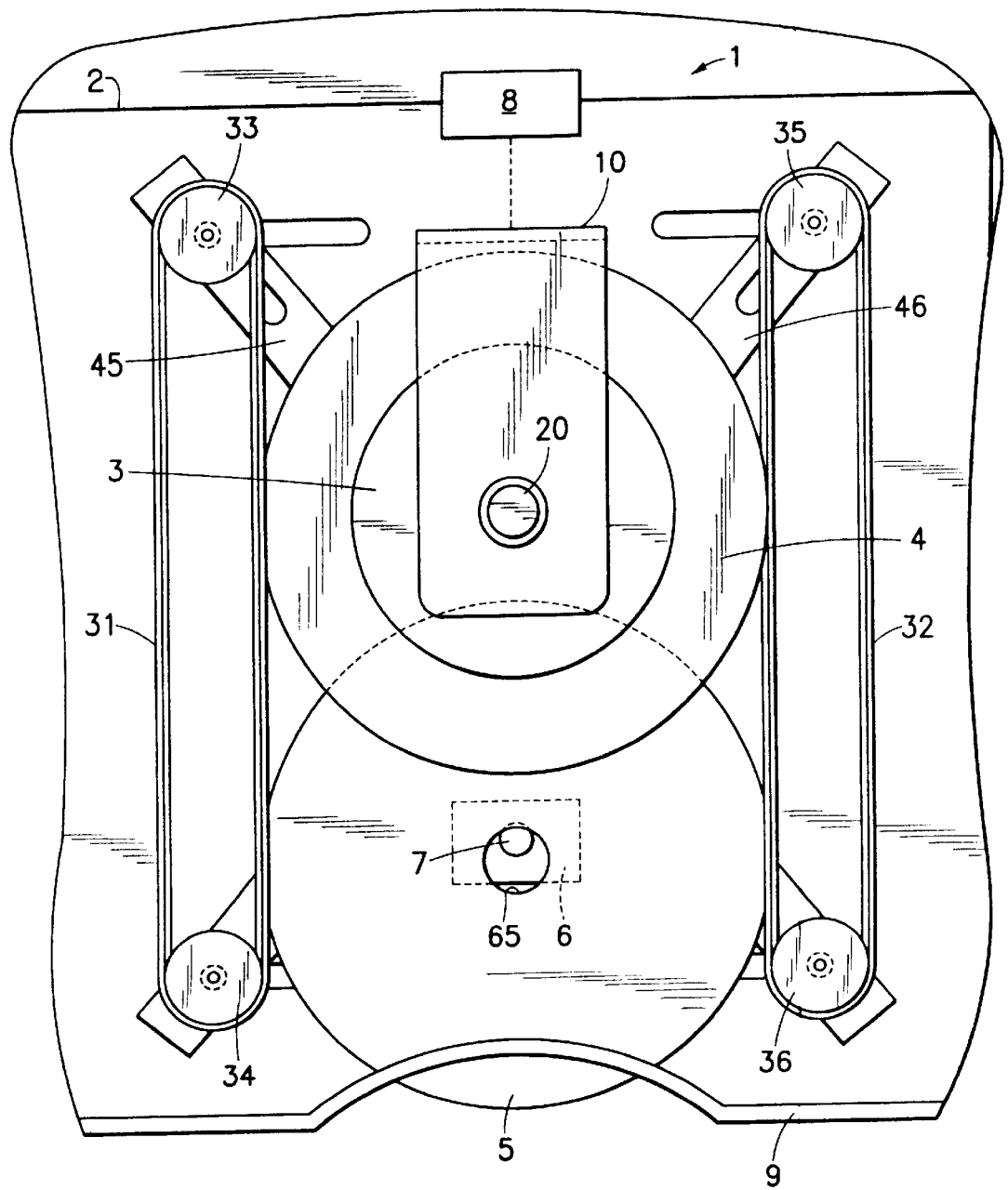
FIG. 16 is a plan view of the disk playback device showing the disk in the eject position.

Referring to FIGS. 11 and 16, during ejection, a negative disk transfer signal is output from output terminal 73 by microprocessor 70. This causes motor 61 to rotate clockwise and motor 62 to rotate counterclockwise. After being transported a certain distance, a portion of second 12 cm. disk 5 projects from the opening in front panel 9. At the final playback position, the distance between the inner sides of drive pulleys 33 and 35 and driven pulleys 34 and 36 is smaller than the diameter of disk 5 so that drive belts 31 and 32 wrap around the rim of second 12 cm. disk 5. Thus, as second 12 cm. disk 5 moves toward the eject position, the distance between driven pulleys 34 and 36, at the eject position, becomes greater than that shown in FIG. 11. Second 12 cm. disk 5 is then transported past driven pulleys 34 and 36, ejecting the disk.

Figure 17:
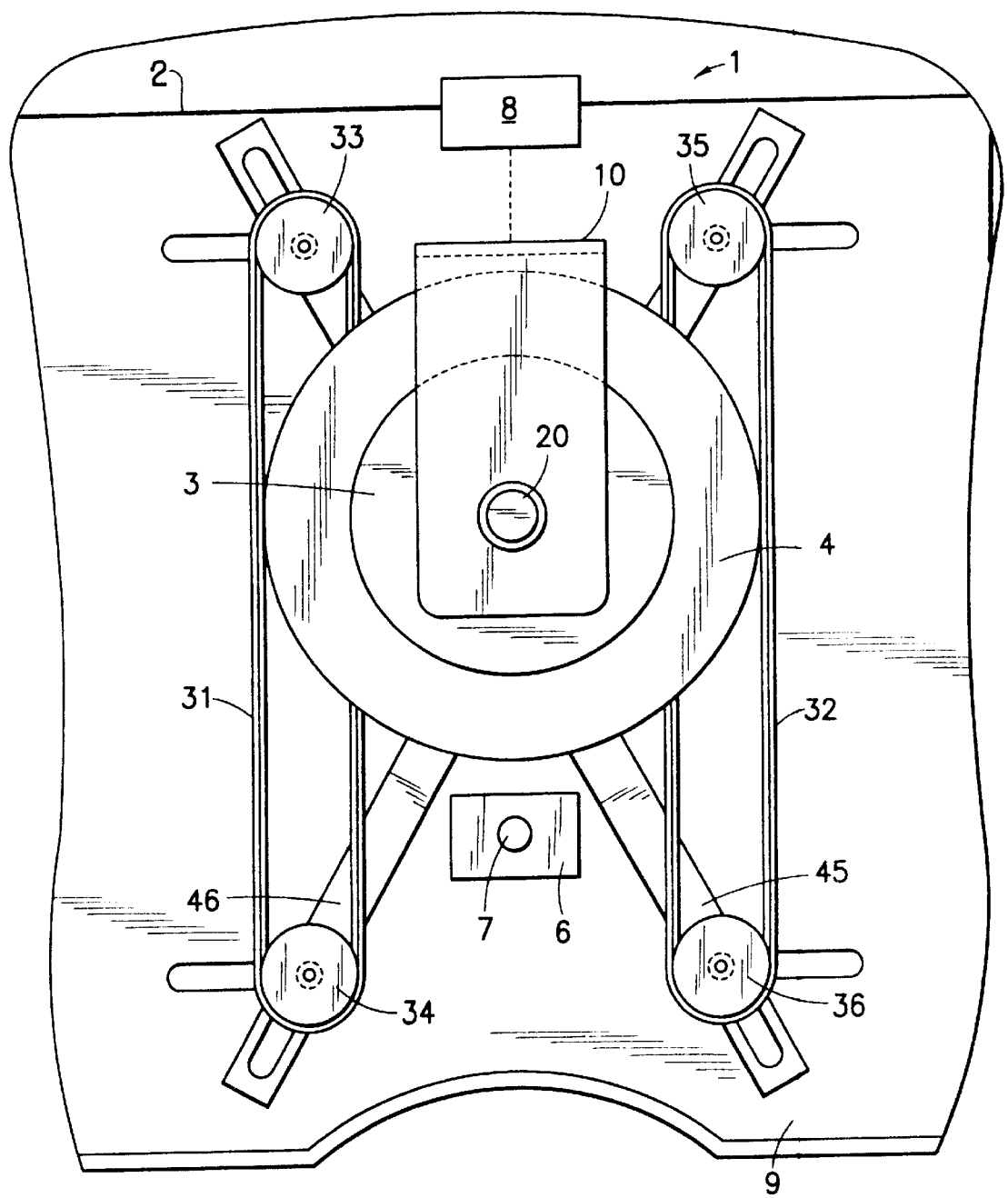
FIG. 17 is a plan view of the device in the loading standby state.

Referring to FIG. 17, when it has been determined that second 12 cm. disk 5 has been removed from disk playback device 1 by the user, microprocessor 70 sends a drive belt transfer control signal through output terminal 77. The drive belt transfer signal causes drive belt transfer mechanism 60 to move drive belts 31 and 32 to the loading standby position shown, allowing loading of 8 cm. or 12 cm. disks. In this position, the distance between the inner sides of driven pulleys 34, 36 is smaller than the diameter of an 8 cm. disk.

When an 8 cm. or 12 cm. disk is inserted from the opening in front panel 9, a force is applied to driven pulleys 34, 36 which pushes them apart, increasing the distance between them. Therefore, sliding plates 47 and 48, connected by rotating arms 45 and 46, move away from each other in the same manner. When this movement is detected, microprocessor 70 outputs a positive disk transfer signal at output terminal 73 to move drive belts 31 and 32 to load the inserted disk into disk playback device 1.

If the loaded disk is to be stored within stocker 10 without being played back, then the following operations are performed. Referring to FIG. 11, when the center of the loaded disk is positioned at the final playback position, microprocessor 70 controls shaft transfer mechanism 25 to move transfer shaft 22 toward lower shaft 23. A tip of regulating shaft 27 presses against the surface of second 12 cm. disk 5. Endless drive belts 31 and 32 are rotated to move second 12 cm. disk 5 toward stocker 10. When center hole 65 of second 12 cm. disk is aligned with regulating shaft 27, regulating shaft 27 inserts into center hole 65 of second 12 cm. disk 5 under the urging of spring 30. Thus second 12 cm. disk 5 is secured in stocker 10.

When moving any disk into stocker 10, the tip of regulating shaft 27 slides against the surface of the disk. To prevent damage to the disk, it is desirable for regulating shaft 27 to be of a material with a low friction coefficient, such as polyacetal resin. It is also possible to attach a member having a low friction coefficient to the tip of regulating shaft 27.

According to the embodiment described above, a pair of endless drive belts are used to transport a disk between an eject position, a playback position, and a storage position. The same endless drive belts rotate a disk at an appropriate speed at the playback position resulting in a low-cost disk playback device.

Although in the embodiment described above, endless drive belts 31 and 32 are rotated simultaneously to transport a disk within the disk playback device 1, it is clear that the rotation of only one of the belts could move a disk between the eject, playback and storage positions. Thus only one motor is required for transporting the disks. Such other embodiments are considered within the spirit and scope of this invention.

Although in the embodiment described above, endless drive belts 31 and 32 rotate a disk to be read at the playback position and gradually reposition the disk as the disk is being read to maintain the portion of the spiral track being read above the fixed optical pickup, it is clear that the optical pickup could be movable relative to the chassis. Thus, the endless drive belts would rotate the disk at the playback position and the optical pickup would move radially, relative to the disk, to remain under the portion of the spiral track being read. Such other embodiments are considered within the spirit and scope of the invention.

Although in the embodiment described above, the storage capacity is limited to three disks, it is clear that the disk holding capacity of the disk player can be any number of disks. Such other embodiments are considered within the spirit and scope of the invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A changer-type disk playback device comprising:

a chassis;

a stocker on said chassis for holding a plurality of disks;

disk playback means for playing back one of said plurality of disks;

at least one endless drive belt rotatably supported by at least two points of said chassis whereby a free-spanning portion of said endless belt drive runs between said two points;

said free-spanning portion being parallel to a disk transport path along which said disk is moved;

said disk transport path running between a disk storage position within said stocker, a playback position at said disk playback means, and an eject position;

transferring means for moving said at least one endless drive belt transversely to a direction of said disk transport path such that said free-spanning portion is always parallel to said disk transport path;

said free-spanning portion being engageable with a rim of said one of said plurality of disks, whereby said one of said plurality of disks is moved between said storage, playback, and eject positions when said at least one endless drive belt is rotated; and drive means for rotating said at least one endless drive belt.

2. The changer-type disk playback device of claim 1 wherein:

said playback position, said eject position and said disk storage position are disposed in a generally straight line, whereby said one of said plurality of disks moves in a straight line when said one of said plurality of disks is moved between storage, playback, and eject positions.

3. The changer-type disk playback device of claim 2, further comprising:

a pair of pulleys, each rotatably and movably connected to said chassis at a respective one of said at least two points;

said at least one drive belt being reeved around said pair of pulleys;

said taut portion of said at least one drive belt stretching between said pair of pulleys defining a straight line;

said transferring means including means for moving said pair of pulleys generally perpendicular to said generally straight line; and said taut portion of said at least one endless drive belt lying in a plane parallel to said disk.

4. The disk playback device of claim 3, wherein:

said at least one endless drive belt has an inner surface and an outer surface;

said inner surface contacts said pair of pulleys;

each of said plurality of disks has a rim; and said outer surface has an outer concave groove that engages said rim of said one of said plurality of disks when said endless drive belt engages said one of said plurality of said disks.

5. The disk playback device of claim 1, wherein said stocker further comprises:

a vertical mounting wall at a rear end of said stocker;

a plurality of mounting plates attached to said vertical mounting wall;

each one of said plurality of mounting plates having an upper surface which supports stored ones of said plurality of disks; and shaft means for restricting horizontal movement of said stored ones.

6. A changer-type disk playback device comprising:

a chassis;

a stocker on said chassis for holding a plurality of disks;

said stocker including a vertical mounting wall at a rear end of said stocker;

a plurality of mounting plates attached to said vertical mounting wall;

each one of said plurality of mounting plates having an upper surface which supports stored ones of said plurality of disks;

shaft means for restricting horizontal movement of said stored ones;

said shaft means including an upper shaft;

a lower shaft;

said upper shaft and said lower shaft being axially aligned with a gap therebetween;

said upper and lower shafts being located along a path of transport of said one of said plurality of disks so that said one of said plurality of disks is in said gap during a transporting of said one of said plurality of disks when said one of said plurality of disks is being transported to said stocker;

bridging means for selectively opening and closing said gap;

disk playback means for playing back one of said plurality of disks;

at least one endless drive belt rotatably supported by at least two points of said chassis to form at least one taut portion running between said at least two points;

said taut portion running along a direction of a disk transport path, between a disk storage position within said stocker, a playback position at said disk playback means, and an eject position;

transferring means for moving said at least one endless drive belt transversely to said direction of disk transport path such that said taut portion stays parallel to said transport path during a movement of said at least one endless drive belt;

said taut portion being engageable with a rim of said one of said plurality of disks, whereby said one of said plurality of disks is moved between said storage, playback, and eject positions when said at least one endless drive belt is rotated; and drive means for rotating said at least one endless drive belt.

7. The disk playback device of claim 6, wherein said bridging means further comprises:

a spring;

a regulating shaft;

said spring urging said regulating shaft downward against said one of said plurality of disks when said one of said plurality of disks is in said gap; and said spring urging said regulating shaft through a center hole of said selected disk when said endless drive belt moves said selected disk into concentric alignment with other disks in said stocker.

8. A disk transfer device comprising:

a vertically movably mounted stocker for storing a plurality of disks;

means for playing back disks;

means for transporting a disk between a playback position at said means for playing back disks and an eject position;

said means for transporting including a drive belt having a free-spanning portion parallel to a path of transport of said disk;

said playback and eject positions lying along said path of transport;

means for engaging a rim of said disk with said drive belt;

means for rotating said drive belt, whereby said disk moves along said path of transport when said rim is engaged with said drive belt and said drive belt is rotated;

drive means for rotating said drive belt; and transferring means for transferring said drive belt in a direction transverse to said path of transport;

said transferring means maintaining a parallel relationship between said free-spanning portion of said drive belt and said direction of said path of transport during a movement of said drive belt transverse to said path of transport.

9. The disk transfer device of claim 8, further comprising:

a stocker for storing a plurality of disks;

a storage position lying in said path of transport; and said disk residing in said storage position when said disk is stored in said stocker.

10. The disk transfer device of claim 8, wherein:

said drive belt is supported by a pair of pulleys;

said transferring means rotatably includes means for supporting said pair of pulleys.

11. The disk transfer device of claim 10 wherein said drive means includes:

a motor having a rotational output; and means for transmitting said rotational output to one of said pair pulleys, whereby said one of said pair of pulleys is rotated.

12. The disk playback device of claim 11, wherein said at least one endless drive belt has an outer V-shaped groove into which said rim of said disk fits when said disk is disk is engaged with said drive belt.

13. A changer-type disk playback device comprising:

a chassis;

a stocker movably mounted on said chassis so that said stocker is moved vertically;

said stocker having means for storing a plurality of disks;

means for playing back a selected one of said plurality of disks;

an endless drive belt;

means for engaging said endless drive belt with a rim of said disk;

means for supporting said endless drive belt at two points of said chassis so that a free-spanning portion runs between said two points;

said free-spanning portion being parallel to a path of travel along which said disk is moved;

said means for engaging including means for moving said means for supporting transversely to said path of travel such that a line connecting said two points of said chassis remains parallel to said path of travel throughout a transverse movement of said means for supporting and so that said free-spanning portion remains parallel to said path of travel throughout said transverse movement;

said path of travel connecting a disk storage position within said stocker, a playback position, at said disk playback means, and an eject position;

drive means for rotating said endless drive belt, whereby said disk engaged with said endless drive belt is caused to move along said path of travel;

means opposite said drive belt for supporting said rim at first point of said rim opposite a second point of said rim at which said drive belt contacts said rim to engage said rim; and said means for supporting including means for urging said disk against said drive belt.

14. A changer-type disk playback device, comprising:

a vertically movably mounted stocker for storing a plurality of disks;

a pair of endless drive belts, each of said pair of endless drive belts having an inner and an outer surface;

said inner surface of one of said pair of endless drive belts facing said inner surface of another of said pair of endless drive belts;

each said inner surface including a free-spanning portion, said free spanning portions being parallel to each other;

transferring means for moving said pair of endless drive belts toward and away from each other, from a first position whereat a distance between said drive belts is smaller than a diameter of said plurality of disks, such that a portion of said inner surface of each one of said pair of endless drive belts engages one of two opposing positions on a rim of a disk of said plurality of disks, to a second position whereat said distance between said drive belts is greater than a diameter of said disk;

driving means for rotating at least one of said pair of endless drive belts, such that said disk is transported along a transport path between a disk storage position, a disk playback position and an eject position;

means for playing back said selected disk while said selected disk is in said playback position; and said transferring means being effective for keeping said free spanning portions of said endless drive belts parallel when said endless drive belts are moved toward and away from each other.

15. A changer-type disk playback device, comprising:

a longitudinal drive member having a portion with a surface;

means for moving said surface parallel along a direction of travel of a disk;

a support member, opposite said surface, for urging an edge of said disk against said surface, whereby said disk is moved in said direction of travel when said surface is moved;

said disk moving from a storage position, to a playback position upon a moving of said surface;

said disk moving from said playback position to an eject position upon a further moving of said surface;

said drive member and said support member being separated by a first distance when said support member urges said edge of said disk against said surface; and means for separating said drive member and said support member by a distance greater than said first distance, whereby said disk is no longer urged against said surface;

said means for separating maintaining said surface parallel to said direction of travel during a separation movement of said drive member and said support member; and said separation movement retracting said surface in a direction transverse to said direction of travel of said disk.

16. A device as in claim 15, further comprising:

said eject and storage positions being separated by a first separation distance;

two rotating supports separated by a second separation distance substantially equal to said first separation distance;

said drive member being a belt; and said belt being suspended between said two rotating supports.

17. A device as in claim 15, further comprising:

said eject and storage positions being separated by a first separation distance;

a first transfer member and a second transfer member;

means for movably connecting said first and second transfer members to said chassis;

first and second rotating supports rotatably connected to said first transfer member and separated by a second separation distance substantially equal to said first separation distance;

said support member being a first belt;

said first belt being suspended between said first and second rotating supports to form at least one first spanning portion;

third and fourth rotating supports rotatably connected to said second transfer member and separated by a third separation distance substantially equal to said first separation distance;

said drive member being a second belt;

said surface being an external surface of said second belt;

said second belt being suspended between said third and fourth rotating supports to form at least one second spanning portion;

said first and second spanning portions being parallel; and said means for movably connecting being effective to permit said first and second transfer members to move apart and together while preventing rotation of said first and second transfer members, whereby said first and second spanning portions remain parallel when said move together and apart.

18. A device as in claim 15, further comprising:

said eject and storage positions being separated by a first separation distance;

two rotating supports separated by a second separation distance substantially equal to said first separation distance;

said support member being a belt; and said belt being suspended between said two rotating supports.

19. A changer-type disk playback device, comprising:

a longitudinal drive member having a portion with a surface;

means for moving said surface parallel along a direction of travel of a disk;

a support member, opposite said surface, for urging an edge of said disk against said surface, whereby said disk is moved in said direction of travel when said surface is moved;

said disk moving from a playback position to an eject position upon a moving of said surface;

said drive member and said support member being separated by a first distance when said support member urges said edge of said disk against said surface;

means for separating said drive member and said support member by a distance greater than said first distance, whereby said disk is no longer urged against said surface;

said means for separating maintaining said surface parallel to said direction of travel during a separation movement of said drive member and said support member; and said separation movement retracting said surface in a direction transverse to said direction of travel of said disk.

* * * * *